United States Patent [19]

Coffinberry

[11] Patent Number: 5,113,669
[45] Date of Patent: May 19, 1992

[54] SELF-POWERED HEAT EXCHANGE SYSTEM

[75] Inventor: George A. Coffinberry, West Chester, Ohio

[73] Assignee: General Electric Company, Cincinnati, Ohio

[21] Appl. No.: 615,757

[22] Filed: Nov. 19, 1990

[51] Int. Cl.$^5$ .............................................. F25D 9/00
[52] U.S. Cl. ..................................................... 62/401
[58] Field of Search ........................... 62/401; 60/643; 417/406

[56] References Cited

U.S. PATENT DOCUMENTS

| | | | |
|---|---|---|---|
| 2,952,982 | 9/1960 | Spalding | 62/401 X |
| 3,080,728 | 3/1963 | Groves et al. | 62/401 X |
| 3,511,161 | 5/1970 | Schindelman | 62/401 X |
| 3,938,336 | 2/1976 | Eskeli | 62/401 X |
| 4,255,095 | 3/1981 | Goulvestre et al. | 417/406 |
| 4,315,403 | 2/1982 | Girard et al. | 60/643 |
| 4,665,714 | 5/1987 | Keller | 62/401 |

Primary Examiner—Lloyd L. King
Attorney, Agent, or Firm—Douglas E. Erickson; Jerome C. Squillaro

[57] ABSTRACT

A heat exchange system for a supersonic flight vehicle. A first conduit connects the gas (e.g., helium) exit of a compressor of a gas-driven turbocompressor to the gas inlet of a turbine of the turbocompressor, and a second conduit connects the gas outlet to the turbine to the gas entrance of the compressor. The first conduit has a portion positioned near a hotter temperature region (e.g., the combustor wall) and the second conduit has a portion positioned near a colder temperature region (e.g., the fuel region) of the flight vehicle. The temperature difference self powers the turbocompressor which can transfer large amounts of heat and which is hermetically-sealed in a housing against gas leaks.

19 Claims, 2 Drawing Sheets

SELF-POWERED HEAT EXCHANGE SYSTEM

BACKGROUND OF THE INVENTION

The present invention relates generally to heat exchange systems, and more particularly to a self-powered and self-contained heat exchange system having application in, among other things, a high speed civil transport flight vehicle.

It is general knowledge in future heat exchangers involving high Mach number engines, such as engines for a commercial SST (SuperSonic Transport), to cool engine combustor walls for reasons of combustor material selection and NOX (nitrogen oxide) reduction and to cool engine turbine cooling air for reasons of turbine material selection. It is further known to let the heat sink for this cooling be the fuel consumed by the engine. This can be achieved with conventional single heat exchanger designs which circulate cooling fuel past hot outside combustor walls (and which are similar to present aircraft heat exchangers which use liquid fuel as the heat sink to cool engine oil). However, such heat exchangers may be objectionable. Fuel leakage through the walls of the fuel-cooled combustor into the combustion chamber can develop localized thermal conditions (often referred to as hot streaking) which are detrimental to the engine high pressure turbine located downstream of the combustor. Also, leakage of fuel through the turbine cooling air duct wall may cause a fire which would be destructive to the engine.

It is also general knowledge in future heat exchange systems that it may be desirable to use a first heat exchanger to cool the hotter combustor wall or the hotter turbine cooling air with an inert fluid, such as helium (other heat transfer fluids such as steam or gaseous fluorocarbons may be used in other applications), and then to transfer thermal energy from the inert fluid to the colder fuel in a second heat exchanger located outside the combustor region. These heat exchange systems interconnect the two heat exchangers by using a secondary cooling circuit having a portion positioned near the hot temperature region (e.g., a combustor wall) to help define the first heat exchanger and having a portion positioned near the cold temperature region (e.g., a fuel flow region) to help define the second heat exchanger. It is known to circulate helium around the secondary cooling circuit by a heat exchange system compressor driven by some power source.

Common power sources to drive heat exchange system compressors include electric motors and auxiliary power shafts connected to a flight vehicle gas turbine engine. Such power sources ultimately derive from the flight vehicle engine which operates less efficiently when some of its power is diverted from propelling the flight vehicle to driving a heat exchange system compressor. Other power sources include air bled from an engine compressor to drive a heat exchange system turbine which is connected by a drive shaft to the heat exchange system compressor to define a turbocompressor. Use of such bleed air decreases engine efficiency. For these and other such applications, containment of the inert fluid within the secondary cooling circuit introduces the problem of fluid leakage through the seals associated with the pumping devices used to circulate the inert fluid in the secondary cooling circuit.

It is known, as in a household refrigerator heat exchange system, to hermetically seal a compressor and its electric motor inside a housing from which only the motor electric wires extend. This arrangement prevents refrigerant gas leaks, but electric motors are unable to drive pumps which are capable of transferring large amounts of heat, as is required for supersonic flight vehicle applications.

It is also known, as in an automobile radiator heat exchanger system, to drive a water pump from an auxiliary power shaft off the engine. This arrangement is capable of transferring larger amounts of heat than the household refrigerator arrangement, but the water pump is prone to leak in the seal region of its power shaft.

What is needed is a heat exchange system capable of transferring large amounts of heat from a hot temperature region of a supersonic flight vehicle to a cold temperature fuel region of the vehicle without leakage of the heat transfer gas from the secondary cooling circuit and without utilizing power from, or decreasing the efficiency of, the flight vehicle engine.

SUMMARY OF THE INVENTION

It is an object of the invention to provide a supersonic flight vehicle heat exchange system capable of transferring large amounts of heat from a hot temperature region to a cold temperature region.

It is an added object of the invention to provide such a heat exchange system which is not susceptible to leakage of the heat transfer fluid.

It is an additional object of the invention to provide such a heat exchange system which does not affect engine power or efficiency.

In a preferred embodiment of the invention, the system for exchanging heat between a hotter temperature region and a colder temperature region includes a gas compressor and apparatus for driving the compressor wherein the apparatus includes a gas-driven device for applying drive power to the compressor. The system also includes a first conduit and a second conduit. The first conduit connects the gas exit of the compressor to the gas inlet of the gas-driven device, with at least a portion of the first conduit positionable near the hotter temperature region. The second conduit connects the gas outlet of the gas-driven device to the gas entrance of the compressor, with at least a portion of the second conduit positionable near the colder temperature region. The compressor, first conduit, gas-driven device, and second conduit together define a gas coolant loop. Preferably, the system further includes a hermetically-sealed housing containing the compressor and the gas-driven device.

In another preferred embodiment of the invention, the system for exchanging heat between a hotter temperature region and a colder temperature region includes a gas-driven turbocompressor. The turbocompressor has a compressor and an interconnected turbine. The system also includes a first conduit and a second conduit. The first conduit connects the gas exit of the compressor to the gas inlet of the turbine, with at least a portion of the first conduit positionable near the hotter temperature region. The second conduit connects the gas outlet of the turbine to the gas entrance of the compressor, with at least a portion of the second conduit positionable near the colder temperature region. The compressor, first conduit, turbine, and second conduit together define a gas coolant loop. Preferably, the system further includes a hermetically-sealed housing containing the turbocompressor.

Several benefits and advantages are derived from the heat exchange system of the invention. In an exemplary embodiment the system uses a turbocompressor, which is capable of transferring large amounts of thermal power. The turbocompressor is contained within a hermetically-sealed housing to prevent leaks of the heat transfer gas. The difference in temperature between the hotter and colder temperature regions powers the turbocompressor without the need to utilize any engine power or to decrease the engine efficiency.

BRIEF DESCRIPTION OF THE DRAWINGS

The accompanying drawings illustrate several preferred embodiments of the present invention wherein.

DETAILED DESCRIPTION OF THE INVENTION

Figure 1:
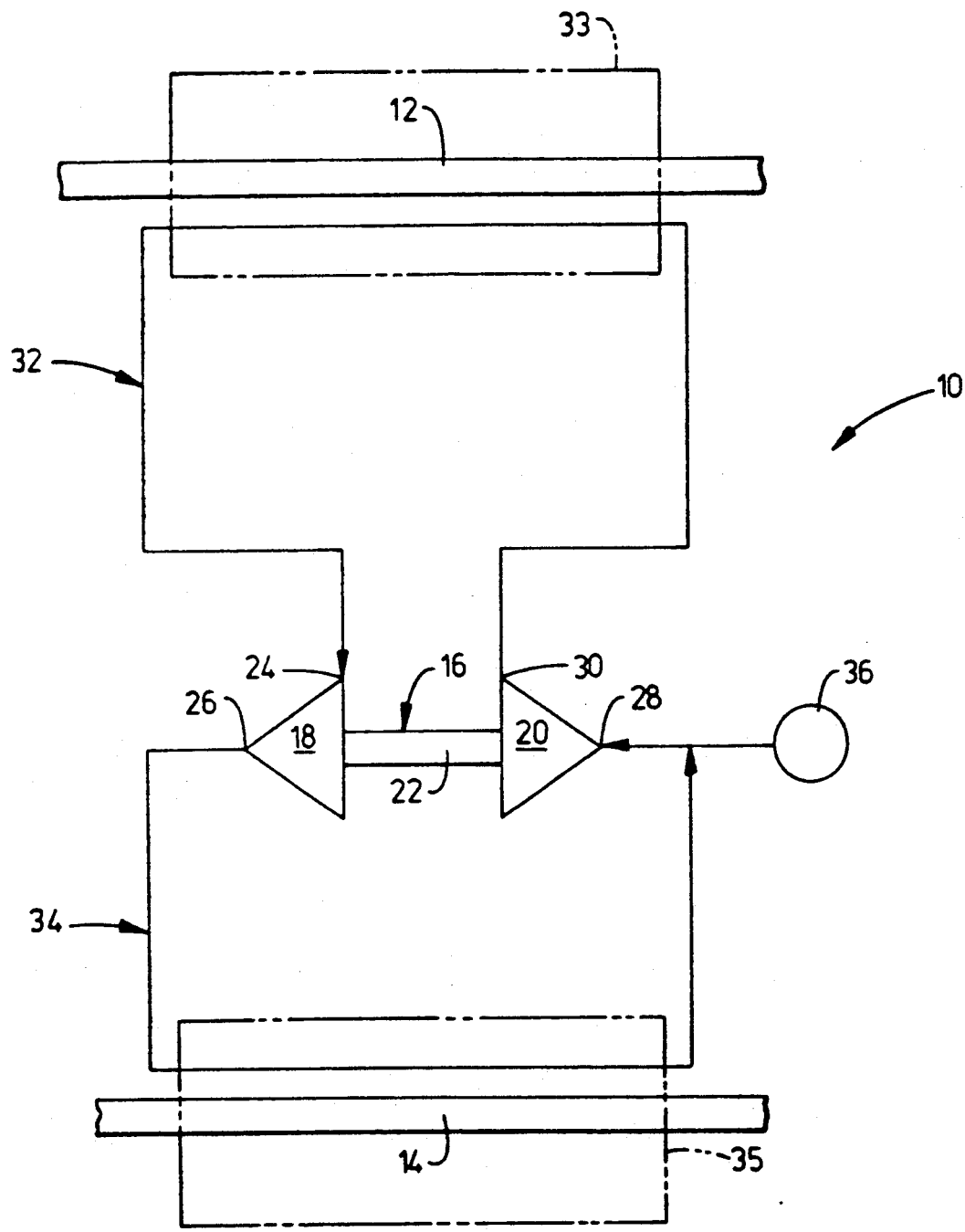
FIG. 1 is a schematic flow diagram of the heat exchange system of the invention.
Figure 2:
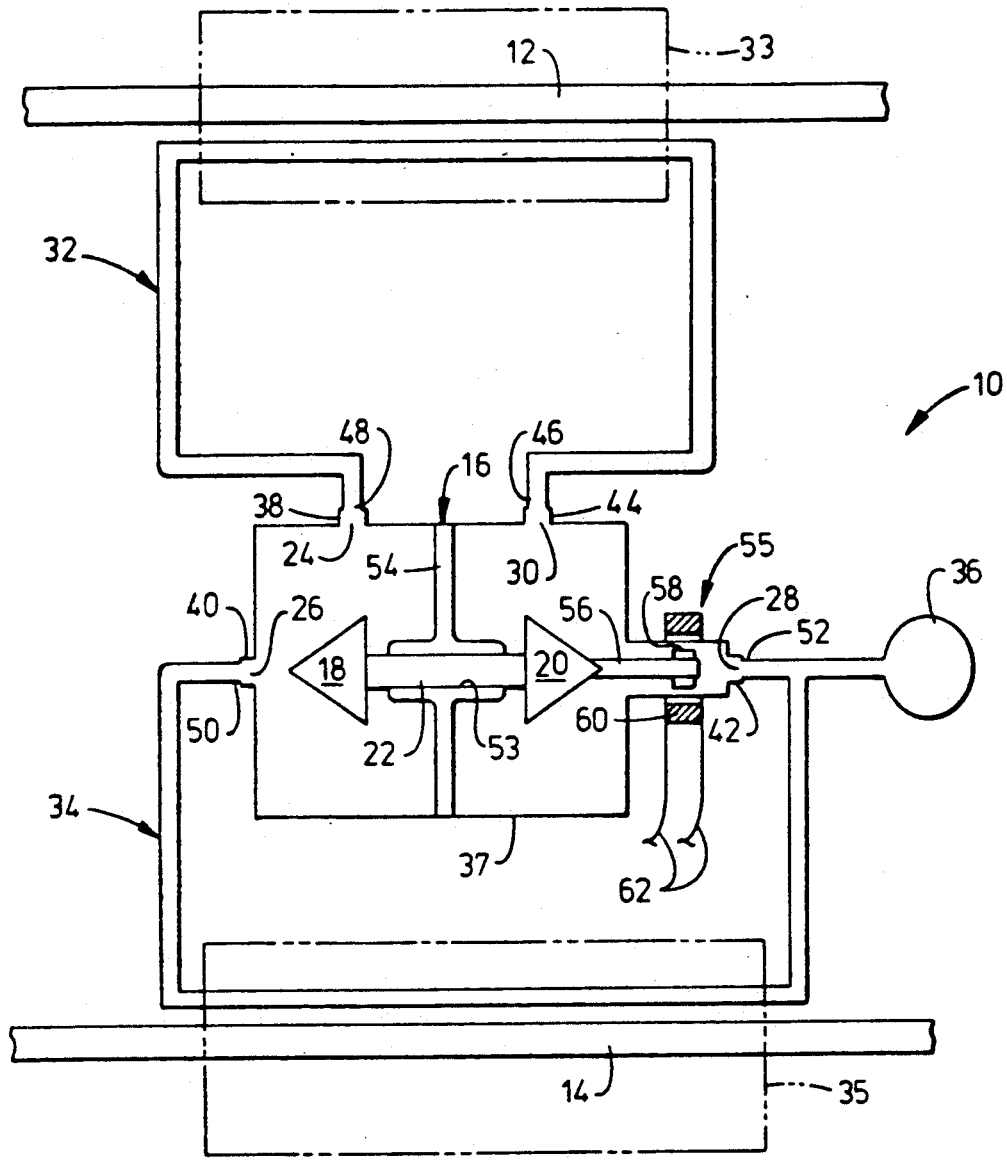
FIG. 2 is a schematic mechanical diagram of the heat exchange system of FIG. 1.

The heat exchange system 10 of the invention, shown in FIGS. 1 and 2, may be employed anywhere it is desired to exchange heat between a hotter temperature region 12, and a colder temperature region 14. In the case of a supersonic flight vehicle, the hotter temperature region 12 may comprise a portion of the engine such as at least a portion of the combustor wall or at least a portion of the turbine cooling air region. Likewise, the colder temperature region 14 may comprise at least a portion of a flight vehicle fuel region, preferably a fuel flow region.

The heat exchange system 10 includes a gas-driven turbocompressor 16 having a turbine 18 and a compressor 20 interconnected by a drive shaft 22. As best shown in FIG. 1, the turbine 18 has a gas inlet 24 and a gas outlet 26, and the compressor 20 has a gas entrance 28 and a gas exit 30. The heat exchange system 10 further includes a first conduit 32 and a second conduit 34. The first conduit 32 connects the gas exit 30 of the compressor 20 to the gas inlet 24 of the turbine 18, and the second conduit 34 connects the gas outlet 26 of the turbine 18 to the gas entrance 28 of the compressor 20. At least a portion of the first conduit 32 is disposable proximate the hotter temperature region 12 to help define a first heat exchanger 33, and at least a portion of the second conduit 34 is disposable proximate the colder temperature region 14 to help define a second heat exchanger 35. The design of heat exchangers is well known in the art and is not considered a part of this invention. It is noted that the term "conduit" is broadly employed to include portions of heat exchangers containing the heat transfer gas.

The compressor 20, first conduit 32, turbine 18, and second conduit 34 are seen to together define a gas coolant loop. The heat exchange system 10 additionally includes a gas accumulator tank 36 which is connected to the gas coolant loop to better account for expansion and contraction of the transfer gas in the gas coolant loop. Preferably, for flight vehicle applications, helium is disposed in the gas coolant loop as the heat transfer gas. Steam, or other gasses may be used in this or other applications. It is noted that the heat exchange system 10 requires a heat transfer gas to work and not a heat transfer liquid. Although the conduits 32 and 34 pose no helium leakage problems, the same cannot be said for the turbocompressor 16.

To prevent helium leaks from the heat exchange system 10, the turbocompressor 16 is contained in a hermetically-sealed housing 37, as shown in FIG. 2. The housing 37 includes a turbine inlet area port 38, a turbine outlet area port 40, a compressor entrance area port 42, and a compressor exit area port 44. The first and second conduits 32 and 34 are seen to be disposed largely outside the housing 37. The first conduit 32 has a first end region 46 hermetically sealed to the compressor exit area port 44 of the housing 37 and a second end region 48 hermetically sealed to the turbine inlet area port 38 of the housing 37. Likewise, the second conduit 34 has a first terminus region 50 hermetically sealed to the turbine outlet area port 40 of the housing 37 and a second terminus region 52 hermetically sealed to the compressor entrance area port 42 of the housing 37. In an exemplary embodiment, the gas accumulator tank 36 is connected to the second circuit 34 outside the housing 37 proximate the compressor entrance area port 42 of the housing 37.

It is pointed out that the turbocompressor 16 of the heat exchange system 10 of the invention is self powered as it derives its power from the difference in temperature between the hotter and colder temperature regions 12 and 14. More specifically, it is the turbine enthalpy gradient in the form of pressure and temperature which turns the turbine 18 and makes the turbocompressor 16 work. The heat energy exchanged from the hotter temperature region 12 to the helium in the first conduit 32 may be viewed as similar to the thermal energy exchanged from a jet engine's combustor to its turbine which drives its compressor. In the invention, heat energy from the hotter temperature region 12 replaces the need for combustion.

In a computer simulation demonstrating the feasibility of the heat exchange system of the invention, 3325 BTU/sec of heat was extracted from the hotter temperature region and delivered to the colder temperature region by a 3.43 pound mass/sec flow of helium through the gas coolant loop. Hot air flow, which constituted the hotter temperature region, decreased in temperature from 1845 to 1571 degrees Rankine with a 0.937 efficiency of heat transfer assumed, for the first heat exchanger 33, between the hotter temperature region 12 and the helium in the first conduit 32. A pressure of 760.6 psia with a temperature of 1011 degrees Rankine was achieved at the gas exit 30 of the compressor 20 and a pressure of 755.6 psia with a temperature of 1792 degrees Rankine was achieved at the gas inlet 24 of the turbine 18. Cold fuel flow, which constituted the colder temperature region, increased in temperature from 760 to 1360 degrees Rankine with a 0.899 efficiency of heat transfer assumed, for the second heat exchanger 35, between the helium in the second conduit 34 and the colder temperature region 14. A pressure of 569.4 psia with a temperature of 1639 degrees Rankine was achieved at the gas outlet 26 of the turbine 18 and a pressure of 544.4 psia with a temperature of 857.5 degrees Rankine was achieved at the gas entrance 28 of the compressor 20.

The drive shaft 22, as seen in FIG. 2, is supported by bearings 53 (such as sleeve bearings or self-lubricating gas dynamic bearings) connected to a support 54 which is attached to the housing 37. The support 54 and bearings 53 also function to separate the turbine 18 from the compressor 20. Leakage of helium inside the housing 37 through the bearings 53 between the compressor 20 and the turbine 18 is insignificant because, as seen from the previously discussed computer simulation, the compressor gas exit pressure (760.6 psia) is almost the same as the turbine gas inlet pressure (755.6 psia).

The heat exchange system 10 of the invention also includes means 55 for initially rotating the drive shaft 22 of the turbocompressor 16. The drive shaft 22 must receive some initial rotation because it cannot start itself. However, once rotation has been started, the heat exchange system 10 becomes self-powered, deriving energy to drive and accelerate the turbine 18 of the turbocompressor 16 from its initial rotation up to its steady state operating speed from the difference in temperatures between the hotter and colder temperature regions 12 and 14, as discussed previously. Just as jet engines need a start to get going, it should not be surprising that the system 10 is dynamically unstable in its rest state and needs a starting rotation of its drive shaft to get it going towards its steady state operation.

In one embodiment (not shown) such means 55 would include the gas coolant loop initially being in at least a partially vacuum state. A charge of helium would be introduced to the gas entrance 28 of the compressor 20 to provide initial rotation to the drive shaft 22.

In another embodiment, as seen in FIG. 2, such means 55 includes a starter rotor 56 attached to a rotatable portion of the compressor 20 inside the housing 37, a permanent magnet 58 (such as a samarium-cobalt super magnet) attached to the starter rotor 56, and a stator 60 disposed outside the housing 37 with the stator having a wire winding whose ends 62 are connected through a switch to a source of electric power (not shown). This arrangement in effect creates an electric motor having its rotating portion inside the housing and its stationary portion outside the housing.

Figure 3:
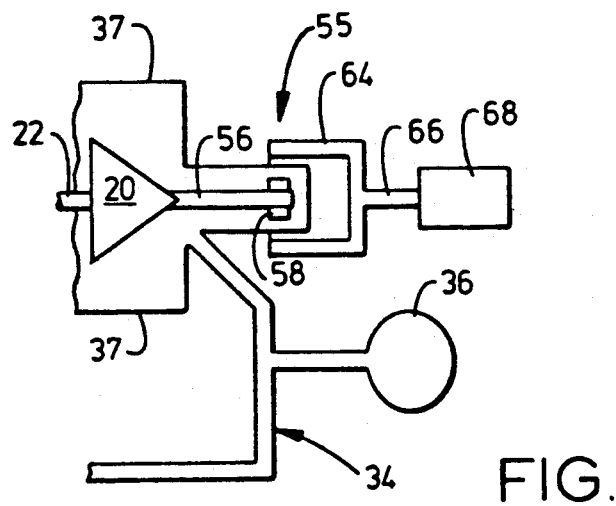
FIG. 3 is a schematic mechanical diagram of the compressor region of FIG. 1 disclosing an alternate embodiment of the invention.

In a further embodiment, as seen in FIG. 3, such means 55 employs magnetic coupling to achieve initial rotation of the drive shaft and includes a first permanent magnet disposed inside the housing 37 on the compressor 20 for rotation with the drive shaft 22 and a motor-driven rotatable second permanent magnet disposed outside the housing 37 circumferentially surrounding the first magnet. Here, the first magnet is magnet 58 of the starter rotor 56 of the compressor 20 located inside the housing 37. The second magnet is magnet 64 which is attached to the motor shaft 66 of a starter motor 68. The rotating second magnet 64 outside the housing 37 rotates the first magnet 58 inside the housing 37 by magnetic coupling. Other magnetic couplings are possible as either the first or second permanent magnets 58 or 64 could be replaced with a piece of iron.

In operation, previously discussed means 55 would be temporarily employed to initially rotate the drive shaft 22. Then such means 55 would be disconnected as the heat exchange system 10 will reach its steady state operation on its own. If it is desired to shut off the system or to regulate the amount of heat transferred by the system between the hotter and colder temperature regions 12 and 14, a number of possibilities present themselves. Changing the flow of fuel, which defines the colder temperature region, would change, in turn, the temperature of the helium entering the compressor 20, the compressor drive power, the turbocompressor speed, the helium flow rate, and hence the amount of heat transferred. Another system shut off or regulation method would be to allow all or some of the helium to flow through a valve (not shown) from the first end region 46 directly to the second end region 48 of the first conduit 32 to bypass the hotter temperature region 12. Alternately, a valve (not shown) could be employed which simply shuts off or regulates the flow of helium in one of the conduits 32 or 34.

Given the above description, one of ordinary skill in the art can apply the heat exchange system 10 of the invention to satisfy the heat exchange needs of a particular application.

It is noted that the invention provides a self-powered, self-contained heat exchange system capable of transferring a small or large amount of heat, as can be appreciated by those skilled in the art. It is understood that the heat exchange system invention is not limited to aircraft jet engines but may be incorporated into other heat exchange applications.

In the broadest form of the invention, the rotary compressor 20 of the drawings can be replaced with any compressor. For example, the compressor can be aerodynamic or positive displacement and the like. Aerodynamic compressors include fan, axial flow, mixed flow, centrifugal, and regenerative compressors and the like. Positive displacement compressors include piston, vane, gear, and lobe compressors and the like. Likewise, the rotary turbine 18 of the drawings can be replaced with any means for driving the compressor. Such driving means include gas-driven means for applying drive power to the compressor, wherein such gas-driven means include a turbine or a gas motor and the like. Turbines include axial, radial and regenerative turbines and the like. Gas motors include piston, vane, gear and lobe gas motors and the like. Also, for the previously-described embodiment having a compressor 20 and interconnected turbine 18, the drive shaft 22 of the drawings may be replaced with any interconnection such as those utilizing a gearbox, a fluid coupling, or a clutch and the like.

In another embodiment of the invention, the driving means also includes the previously-mentioned compressor initial starting means and means for applying supplemental drive power to the compressor in addition to the drive power applied by the gas-driven means. Although in certain applications the gas-driven means would solely drive the compressor, in other applications such supplemental drive power means may be needed or desired to operate the compressor at some predetermined level of operation. Such supplemental drive power means may include any externally-powered motor and the like. In a preferred embodiment, the compressor initial starting means 55 is simply left on to define the supplemental drive power means. It is pointed out that, in these other applications, the presence of the gas-driven means (e.g., turbine 18) of the invention reduces the amount of outside power (e.g., the amount of electricity for motor 68 when used as the supplemental drive power means) needed to drive the compressor (e.g., compressor 20).

The foregoing description of several preferred embodiments of the invention has been presented for purposes of illustration. It is not intended to be exhaustive or to limit the invention to the precise form disclosed, and obviously many modifications and variations are possible in light of the above teachings all of which are within the scope of the claims appended hereto.

I claim:

1. A system for exchanging heat between a hotter temperature region and a colder temperature region, said system comprising:

(a) a gas compressor having a gas entrance and a gas exit;
(b) means for driving said compressor, said driving means including gas-driven means for applying drive power to said compressor, said gas-driven means having a gas inlet and a gas outlet;
(c) a first conduit connecting said gas exit of said compressor to said gas inlet of said gas-driven means, at least a portion of said first conduit disposable proximate said hotter temperature region; and
(d) a second conduit connecting said gas outlet of said gas-driven means to said gas entrance of said compressor, at least a portion of said second conduit disposable proximate said colder temperature region, wherein said compressor, said first conduit, said gas-driven means, and said second conduit together define a gas coolant loop.

2. The system of claim 1 also including a gas accumulator tank connected to said gas coolant loop.

3. The system of claim 1, also including helium disposed in said gas coolant loop.

4. The system of claim 1, also including a hermetically-sealed housing containing said compressor and said gas-driven means.

5. The system of claim 1, wherein said driving means also includes means for initially starting said compressor.

6. The system of claim 1, wherein said driving means also includes means for applying supplemental drive power to said compressor in addition to that applied by said gas-driven means.

7. A system for exchanging heat between a hotter temperature region and a colder temperature region, said system comprising:
(a) a gas-driven turbocompressor having a compressor and an interconnected turbine, said turbine having a gas inlet and a gas outlet and said compressor having a gas entrance and a gas exit;
(b) a first conduit connecting said gas exit of said compressor to said gas inlet of said turbine, at least a portion of said first conduit disposable proximate said hotter temperature region; and
(c) a second conduit connecting said gas outlet of said turbine to said gas entrance of said compressor, at least a portion of said second conduit disposable proximate said colder temperature region, wherein said compressor, said first conduit, said turbine, and said second conduit together define a gas coolant loop.

8. The system of claim 7 also including a gas accumulator tank connected to said gas coolant loop.

9. The system of claim 7, also including helium disposed in said gas coolant loop.

10. The system of claim 7, also including a hermetically-sealed housing containing said turbocompressor.

11. The system of claim 10, wherein said housing includes a turbine inlet area port, a turbine outlet area port, a compressor entrance area port, and a compressor exit area port and wherein said first and second conduits are disposed largely outside said housing, said first conduit having a first end region hermetically sealed to said compressor exit area port and a second end region hermetically sealed to said turbine inlet area port of said housing and said second conduit having a first terminus region hermetically sealed to said turbine outlet area port and a second terminus region hermetically sealed to said compressor entrance area port of said housing.

12. The system of claim 11, also including a gas accumulator tank connected to said second conduit outside said housing proximate said compressor entrance area port of said housing.

13. The system of claim 10, also including means for initially starting said compressor.

14. The system of claim 13, wherein said compressor is a rotary compressor and wherein said means include a first magnet disposed inside said housing on said compressor for rotation with said compressor and a motor-driven rotatable second magnet disposed outside said housing circumferentially surrounding said first magnet.

15. The system of claim 10, wherein said hotter temperature region comprises a portion of a flight vehicle engine and said colder temperature region comprises at least a portion of a flight vehicle fuel region.

16. The system of claim 15, wherein said flight vehicle engine portion includes a combustor wall and said hotter temperature region comprises at least a portion of said combustor wall.

17. The system of claim 15, wherein said flight vehicle engine portion includes a turbine cooling air region and said hotter temperature region comprises at least a portion of said turbine cooling air region.

18. The system of claim 7, also including means for applying supplemental drive power to said compressor in addition to that applied by said turbine.

19. The system of claim 18, wherein said compressor is a rotary compressor and wherein said means include a first magnet disposed inside said housing on said compressor for rotation with said compressor and a motor-driven rotatable second magnet disposed outside said housing circumferentially surrounding said first magnet.

* * * * *